United States Patent
Zhang et al.

(10) Patent No.: US 9,582,126 B2
(45) Date of Patent: Feb. 28, 2017

(54) DOUBLE-SIDED TOUCH DISPLAY DEVICE

(71) Applicant: BOE TECHNOLOGY GROUP CO., LTD., Beijing (CN)

(72) Inventors: Wenlin Zhang, Beijing (CN); Zhanfeng Cao, Beijing (CN); Guanbao Hui, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 135 days.

(21) Appl. No.: 14/422,746

(22) PCT Filed: Apr. 30, 2014

(86) PCT No.: PCT/CN2014/076616
§ 371 (c)(1),
(2) Date: Feb. 20, 2015

(87) PCT Pub. No.: WO2015/096341
PCT Pub. Date: Jul. 2, 2015

(65) Prior Publication Data
US 2016/0018923 A1    Jan. 21, 2016

(30) Foreign Application Priority Data
Dec. 27, 2013  (CN) .......................... 2013 1 0741337

(51) Int. Cl.
*G06F 3/044* (2006.01)
*G06F 3/01* (2006.01)
(Continued)

(52) U.S. Cl.
CPC .............. *G06F 3/044* (2013.01); *G06F 3/016* (2013.01); *G06F 3/0412* (2013.01);
(Continued)

(58) Field of Classification Search
CPC ........ G06F 3/016; G06F 3/0412; G06F 3/044; G06F 2203/04103; G09G 2300/04
See application file for complete search history.

(56) References Cited

U.S. PATENT DOCUMENTS

| | | | | |
|---|---|---|---|---|
| 2008/0007539 A1* | 1/2008 | Hotelling | ................ | G06F 3/044 345/173 |
| 2010/0247901 A1* | 9/2010 | Hsieh | ................... | G02B 6/0041 428/328 |

(Continued)

FOREIGN PATENT DOCUMENTS

| | | |
|---|---|---|
| CN | 103309072 A | 9/2013 |
| CN | 203179884 U | 9/2013 |

(Continued)

OTHER PUBLICATIONS

Notification of the First Office Action dated Feb. 2, 2016 corresponding to Chinese application No. 201310741337.3.

(Continued)

*Primary Examiner* — Larry Sternbane
(74) *Attorney, Agent, or Firm* — Nath, Goldberg & Meyer; Joshua B. Goldberg; Leonid D. Thenor

(57) ABSTRACT

The present invention relates to the field of display technology, and particularly to a double-sided touch display device which comprises a touch feedback electrode, a first touch receiving electrode and a second touch receiving electrode, wherein the first touch receiving electrode and the second touch receiving electrode are provided at both sides of the touch feedback electrode, respectively. The double-sided touch display device achieve functions of both double-sided touch and transparent display, and has a simple structure and low production cost.

17 Claims, 3 Drawing Sheets

(51) Int. Cl.
    *G09G 3/36*     (2006.01)
    *G06F 3/041*     (2006.01)

(52) U.S. Cl.
    CPC ............. *G06F 2203/04103* (2013.01); *G06F 2203/04104* (2013.01); *G06F 2203/04107* (2013.01); *G09G 3/36* (2013.01); *G09G 2300/04* (2013.01)

(56) References Cited

U.S. PATENT DOCUMENTS

| | | | | |
|---|---|---|---|---|
| 2012/0098790 | A1* | 4/2012 | Han | G06F 3/045 345/174 |
| 2013/0241869 | A1* | 9/2013 | Kida | G06F 3/044 345/174 |
| 2013/0257789 | A1* | 10/2013 | Kwon | G06F 3/044 345/174 |
| 2013/0285881 | A1 | 10/2013 | Loo et al. | |

FOREIGN PATENT DOCUMENTS

| | | |
|---|---|---|
| CN | 203217105 U | 9/2013 |
| CN | 103699269 A | 4/2014 |

OTHER PUBLICATIONS

International Application No. PCT/CN2014/076616, International Search Report dated Sep. 25, 2014, sixteen(16) pages.

\* cited by examiner

DOUBLE-SIDED TOUCH DISPLAY DEVICE

This is a National Phase Application filed under 35 U.S.C. 371 as a national stage of PCT/CN2014/076616, filed Apr. 30, 2014, and claims priority benefit from Chinese Application No. 201310741337.3, filed Dec. 27, 2013, the content of each of which is hereby incorporated by reference in its entirety.

FIELD OF THE INVENTION

The present invention relates to the field of display technology, and particularly to a double-sided touch display device.

BACKGROUND OF THE INVENTION

With the continuous development and progress of modern display technology, touch technology has become deeply and increasingly involved in people' life. Currently, in touch technology, two popular principal techniques are "in-cell" type touch structure and "on-cell" touch structure. The "in-cell" type touch structure is a structure in which the function of a touch panel is embedded into pixel regions, and the "on-cell" type touch structure is a structure in which the function of a touch panel is embedded outside pixel regions. By contrast, the "in-cell" type touch structure, due to its advantages such as light weight, stronger antijamming capability, capability of realizing multi-touch and the like, has become a research hotspot in recent years.

In the meanwhile, transparent display technology has gradually come onto the scene. In terms of visual experience, since a viewer can see an object at one side of a transparent display device from the other side of the same, no visual feeling of massiness arises, but a feeling of infinite space is brought to the viewer. Moreover, many parts may be omitted in the overall structure of the transparent display device (e.g., a casing at the backside of the transparent display device may be omitted), and therefore, certain advantage in manufacturing cost can be gained.

As the transparent display technology and the touch technology continuously go deep into various fields of social life and continuously affect people's life, display technology combining the transparent display technology and the touch technology has broad development prospects in the future. However, at present, a product perfectly combining the transparent display technology and the touch technology has not emerged yet.

SUMMARY OF THE INVENTION

The technical problem to be solved by the present invention is providing a double-sided touch display device which has functions of both double-sided touch and transparent display, a simple structure and low production cost, in view of the above deficiencies in the prior art.

A technical solution adopted to solve the technical problem of the present invention is a double-sided touch display device, which comprises a touch feedback electrode, a first touch receiving electrode and a second touch receiving electrode, wherein the first touch receiving electrode and the second touch receiving electrode are provided at both sides of the touch feedback electrode, respectively.

As a preferable solution, the display device comprises a color filter substrate and an array substrate which are arranged oppositely, the first touch receiving electrode is arranged on the color filter substrate, the second touch receiving electrode is arranged on the array substrate, and both the first touch receiving electrode and the second touch receiving electrode are arranged crosswise with respect to the touch feedback electrode to generate mutual capacitances.

Preferably, the touch feedback electrode is arranged at a side of the array substrate close to the color filter substrate; the first touch receiving electrode is arranged at a side of the color filter substrate away from the array substrate or at a side of the color filter substrate close to the array substrate, the second touch receiving electrode is arranged at a side of the array substrate away from the color filter substrate or at the side of the array substrate close to the color filter substrate, and the second touch receiving electrode is insulated from the touch feedback electrode at cross areas.

Preferably, the array substrate comprises a second substrate and a thin film transistor, a pixel electrode and a common electrode which are arranged on the second substrate, the thin film transistor comprises a gate, a source and a drain, the pixel electrode and the drain are electrically connected, and the touch feedback electrode and the common electrode are formed from the same layer of film in one patterning process.

Preferably, a liquid crystal layer is provided between the color filter substrate and the array substrate, a side light source, which comprises a light source and a light guide plate arranged at a side of the light source close to the array substrate, is provided at a side of the array substrate, and light emitted from the light source enters the array substrate after guided by the light guide plate.

Preferably, the second substrate is made of polymethyl methacrylate, and is doped with photoinduced reflection particles therein to allow the light emitted from the side light source toward the second substrate to be reflected and refracted.

Preferably, the photoinduced reflection particles are nanoscale metal oxide, nanoscale non-metal oxide, nanoscale metal salt or nanoscale rare-earth metal.

As another solution, the display device comprises an array substrate, in which a light-emitting device is provided, the first touch receiving electrode and the second touch receiving electrode are arranged on the array substrate, and both the first touch receiving electrode and the second touch receiving electrode are arranged crosswise with respect to the touch feedback electrode to generate mutual capacitances.

Preferably, the touch feedback electrode is arranged above or below the light-emitting device; the first touch receiving electrode and the second touch receiving electrode are respectively provided at upper and lower sides of the array substrate, and the first touch receiving electrode and the second touch receiving electrode are respectively insulated from the touch feedback electrode at cross areas.

Preferably, the light-emitting device is a white organic light-emitting diode (WOLED) device or an organic light-emitting diode (OLED) device.

Preferably, the light-emitting device is the WOLED device, and a color filter layer is further provided on the array substrate and arranged at a light-emitting side of the WOLED device.

Preferably, the WOLED device/OLED device comprises a pixel electrode, which is an anode or a cathode of the WOLED device/OLED device, and the touch feedback electrode and the pixel electrode are formed from the same layer of film in one patterning process.

Preferably, the first touch receiving electrode comprises a plurality of first touch receiving electrode rows arranged in parallel, each of which comprises a plurality of first touch receiving sub-electrodes which are electrically connected in sequence, the second touch receiving electrode comprises a plurality of second touch receiving electrode rows arranged in parallel, each of which comprises a plurality of second touch receiving sub-electrodes which are electrically connected in sequence, the touch feedback electrode comprises a plurality of touch feedback electrode columns arranged in parallel, each of which comprises a plurality of touch feedback sub-electrodes which are electrically connected in sequence, and arrangement directions of the first touch receiving electrode rows and the second touch receiving electrode rows are the same, and are perpendicular to that of the touch feedback electrode columns, respectively.

Preferably, the touch feedback sub-electrodes included in each touch feedback electrode column have the same number as and are in one-to-one correspondence in position with the first touch receiving electrode rows and/or the second touch receiving electrode rows; the first touch receiving sub-electrodes included in each first touch receiving electrode row and/or the second touch receiving sub-electrodes included in each second touch receiving-electrode row have the same number as and are in one-to-one correspondence in position with the touch feedback electrode columns.

Preferably, the first touch receiving sub-electrode, the second touch receiving sub-electrode and the touch feedback sub-electrode each have a shape of rhombus.

Preferably, the display device further comprises a touch controller and a central controller, the first touch receiving electrode, the second touch receiving electrode and the touch feedback electrode are all electrically connected to the touch controller, the touch controller is configured to receive instructions from the central controller and transfer the instructions to the touch feedback electrode, so as to instruct the touch feedback electrode to perform scanning column by column, meanwhile, to input an initial signal to one end of each of the first touch receiving electrode rows and/or one end of each of the second touch receiving electrode rows, to read a terminal signal at the other end of each of the first touch receiving electrode rows and/or the other end of each of the second touch receiving electrode rows, to determine coordinates of a touch point based on a difference in the terminal signals read from the respective first touch receiving electrode rows and/or the respective second touch receiving electrode rows, and to transmit the coordinates to the central controller.

The beneficial effects of the present invention are as follows: two touch receiving electrodes are respectively provided at both sides of the touch feedback electrode, and the touch receiving electrodes and the touch feedback electrode are connected to corresponding driving circuits, thus achieving double-sided touch; meanwhile, a light source is provided, brightness of the light source is controlled by an external circuit, so as to control grayscale of a displayed picture, thus achieving effects of double-sided touch and transparent display. The double-sided touch display device achieves functions of both double-sided touch and transparent display, and has a simple structure and low power consumption.

Figure 1:
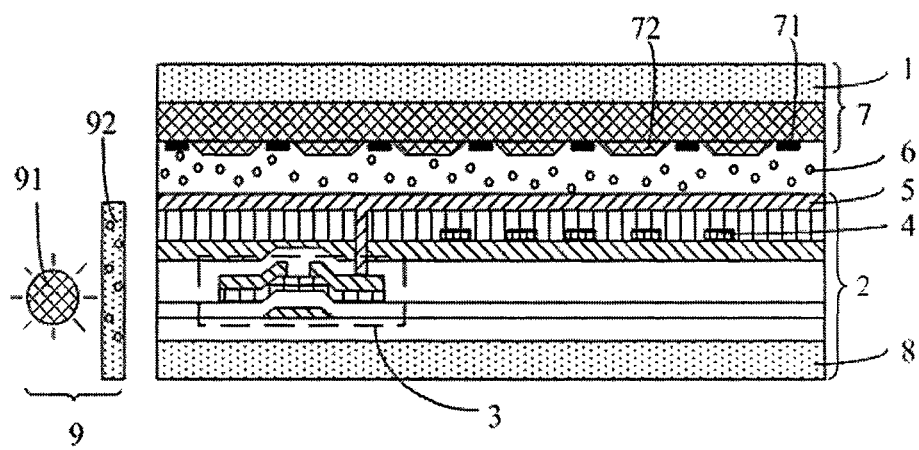
FIG. 1 is a sectional view of a double-sided touch display device according to Embodiment 1 of the present invention.

Reference numerals: 1—first touch receiving electrode, 11—first touch receiving sub-electrode, 2—array substrate, 21—photoinduced reflection particle, 3—thin film transistor, 4—touch feedback electrode, 41—touch feedback sub-electrode, 5—pixel electrode, 6—liquid crystal layer, 7—color filter substrate, 71—black matrix, 72—color filter layer, 8—second touch receiving electrode, 81—second touch receiving sub-electrode, 9—side light source, 91—light source, 92—light guide plate, 10—touch controller, 110—WOLED device, 12—background object.

DETAILED DESCRIPTION OF THE EMBODIMENTS

To enable those skilled in the art to better understand the technical solutions of the present invention, a double-sided touch display device of the present invention will be further described in detail below in conjunction with the accompanying drawings and the specific implementations.

Embodiment 1

The present embodiment provides a double-sided touch display device, which comprises a touch feedback electrode, a first touch receiving electrode and a second touch receiving electrode, and the first touch receiving electrode and the second touch receiving electrode are provided at both sides of the touch feedback electrode, respectively.

In the present embodiment, the double-sided touch display device is a liquid crystal display device. FIG. 1 is a sectional view of the double-sided touch display device according to Embodiment 1 of the present invention. As shown in FIG. 1, the liquid crystal display device comprises a color filter substrate 7 and an array substrate 2 which are arranged oppositely, the first touch receiving electrode 1 (Rx1) is arranged on the color filter substrate 7, the second touch receiving electrode 8 (Rx2) is arranged on the array substrate 2, and both the first touch receiving electrode 1 and the second touch receiving electrode 8 are arranged crosswise with respect to the touch feedback electrode 4 (Tx) to generate mutual capacitances.

In the present embodiment, an "in-cell" type touch structure or an "on-cell" type touch structure may be adopted. Here, the touch feedback electrode 4 may be arranged at an inner side of the array substrate 2 (i.e., a side of the array substrate 2 close to the color filter substrate 7), the first touch receiving electrode 1 may be arranged at an outer side (i.e., a side of the color filter substrate 7 away from the array substrate 2) or an inner side (i.e., a side of the color filter substrate 7 close to the array substrate 2) of the color filter substrate 7, the second touch receiving electrode 8 may be arranged at an outer side (i.e., a side of the array substrate 2 away from the color filter substrate 7) or the inner side of the array substrate 2, as long as it can be ensured that the first touch receiving electrode 1 and the second touch receiving electrode 8 are arranged at both sides of the touch feedback electrode 4, respectively, and the second touch receiving electrode 8 is insulated from the touch feedback electrode 4 at cross areas.

As shown in FIG. 1, the color filter substrate 7 comprises a first substrate (not specifically indicated in FIG. 1), and a black matrix 71 and a color filter layer 72 which are arranged on the first substrate, the array substrate 2 comprises a second substrate (not specifically indicated in FIG. 1), and a thin film transistor 3, a pixel electrode 5 and a common electrode which are arranged on the second substrate, the thin film transistor 3 comprises a gate, a source and a drain (a structure of the thin film transistor 3 is not specifically indicated in FIG. 1), and the pixel electrode 5 and the drain of the thin film transistor 3 are electrically connected. In the present embodiment, the pixel electrode 5 and the common electrode are at least partially overlapped in orthographic projection direction (i.e., planar projection direction), the pixel electrode 5 may be located above or below the common electrode; further, to simplify manufacturing process, in the present embodiment, one layer of thin film is adopted, and patterns of the touch feedback electrode 4 and the common electrode are respectively formed in one patterning process.

Figure 2:
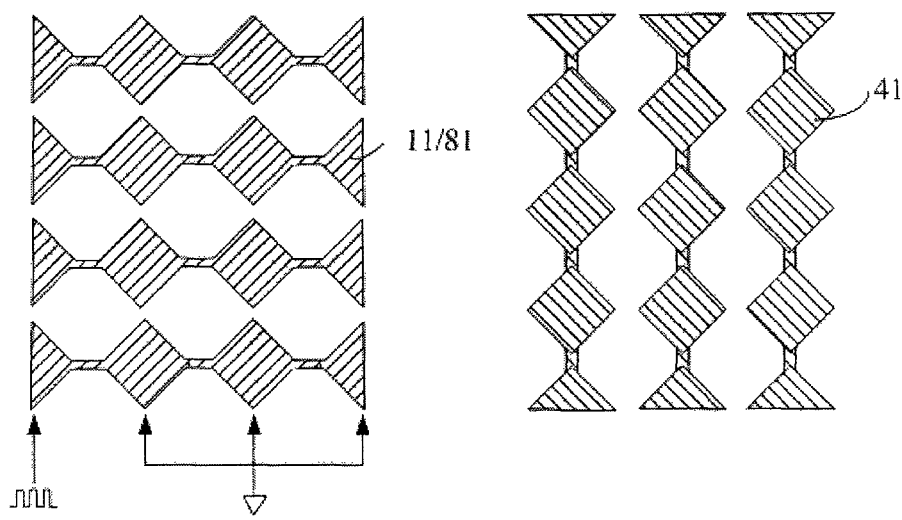
FIG. 2 is a plan view of a touch receiving electrode and a touch feedback electrode in the double-sided touch display device shown in FIG. 1.

As shown in FIG. 2, the first touch receiving electrode 1 comprises a plurality of first touch receiving electrode rows arranged in parallel, each of which comprises a plurality of first touch receiving sub-electrodes 11 which are electrically connected in sequence. Similarly, the second touch receiving electrode 8 comprises a plurality of second touch receiving electrode rows arranged in parallel, each of which comprises a plurality of second touch receiving sub-electrodes 81 which are electrically connected in sequence. The touch feedback electrode 4 comprises a plurality of touch feedback electrode columns arranged in parallel, each of which comprises a plurality of touch feedback sub-electrodes 41 which are electrically connected in sequence. The arrangement directions of the first touch receiving electrode rows and the second touch receiving electrode rows are the same, and are perpendicular to that of the touch feedback electrode columns, respectively. Preferably, the touch feedback sub-electrodes included in each touch feedback electrode column have the same number as and are in one-to-one correspondence in position with the first touch receiving electrode rows and/or the second touch receiving electrode rows; the first touch receiving sub-electrodes included in each first touch receiving electrode row and/or the second touch receiving sub-electrodes included in each second touch receiving electrode row have the same number as and are in one-to-one correspondence in position with the touch feedback electrode columns. In the present embodiment, the first touch receiving sub-electrode 11, the second touch receiving sub-electrode 81 and the touch feedback sub-electrode 41 each have a shape of rhombus, and undoubtedly may have other shape such as triangle, rectangle, polygon or the like.

Figure 4:
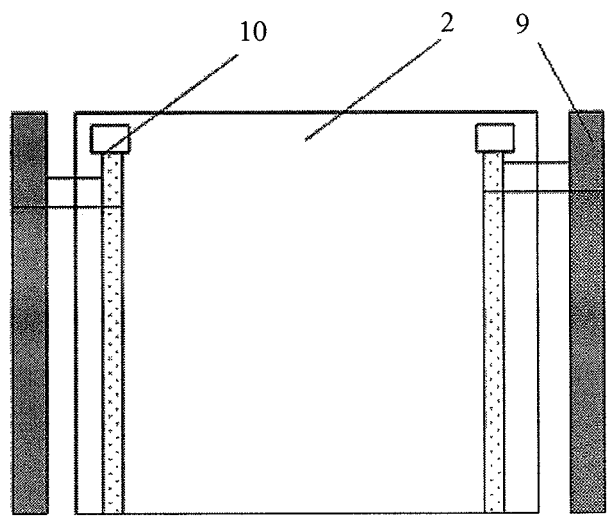
FIG. 4 is a top view illustrating relative positions of a side light source and an array substrate in Embodiment 1 of the present invention.

To achieve touch control and coordinate with display signals of a display device, as shown in FIG. 4, the liquid crystal display device further comprises a touch controller 10 and a central controller (not shown in FIG. 4). The first touch receiving electrode 1, the second touch receiving electrode 8 and the touch feedback electrode 4 are all electrically connected to the touch controller 10. The touch controller 10 is configured to receive instructions from the central controller and transfer the instructions to the touch feedback electrode 4, so as to instruct the touch feedback electrode 4 to perform scanning column by column, and meanwhile, to input an initial signal (e.g., a constant voltage) to one end of each of the first touch receiving electrode rows and/or one end of each of the second touch receiving electrode rows, to read a terminal signal (e.g., a constant voltage, or a voltage which is changed due to mutual inductance caused by a touch) from the other end of each of the first touch receiving electrode rows and/or the other end of each of the second touch receiving electrode rows, to determinate coordinates of a touch point based on a difference in the terminal signals read from respective first touch receiving electrode rows and/or respective second touch receiving electrode rows, and to transmit the coordinates to the central controller.

Specifically, in the working process of the double-sided touch display device, when a high pulse signal is applied to any one of the touch feedback electrode columns, low pulse signals are applied to the others of the touch feedback electrode columns (equivalent to being grounded); meanwhile, the respective first touch receiving electrode rows and/or the respective second touch receiving electrode rows are detected row by row, when a change in mutual capacitance at a cross-point of a touch receiving electrode row and a touch feedback electrode column is detected, a touch position on the display panel (which is formed after injecting liquid crystals into cell-aligned color filter substrate and array substrate) can be obtained through calculation performed by the touch controller 10, and further a response is made by the central controller, thereby achieving the purpose of touch control.

Figure 3:
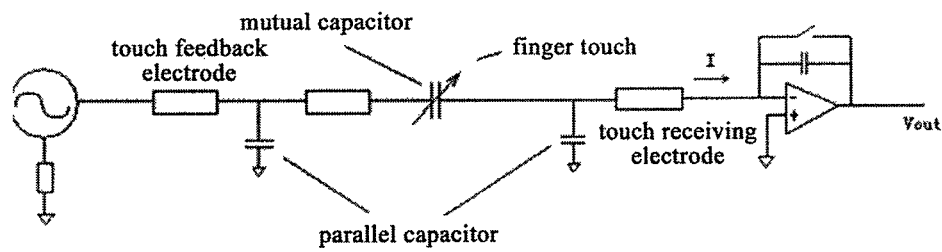
FIG. 3 is an equivalent circuit diagram of the touch receiving electrode and the touch feedback electrode shown in FIG. 2 during a touch.

A touch on the display panel will cause a change in mutual capacitance between the touch receiving electrode and the touch feedback electrode. FIG. 3 is an equivalent circuit for mutual capacitance charge detection. The mutual capacitance charge detection generally refers to detection of voltages or charges at the touch receiving electrode end (sense end). When a finger touches the display panel, the equivalent mutual capacitance at the position on the display panel touched by the finger is reduced, and at this point, it is detected that the charges on the mutual capacitance are reduced.

In the present embodiment, patterns of the first touch receiving electrode and the second touch receiving electrode are formed on the color filter substrate and the array substrate, respectively, in the meanwhile, touch receiving lines are correspondingly provided; in the manufacturing process of the array substrate, patterns including the TFT and the touch feedback electrode are respectively formed, then the first touch receiving electrode, the second touch receiving electrode and the touch feedback electrode are electrically connected to the external touch controller 10, respectively, and the touch controller 10 is electrically connected to the central controller, thus achieving the purpose of double-sided touch control.

Figure 5:
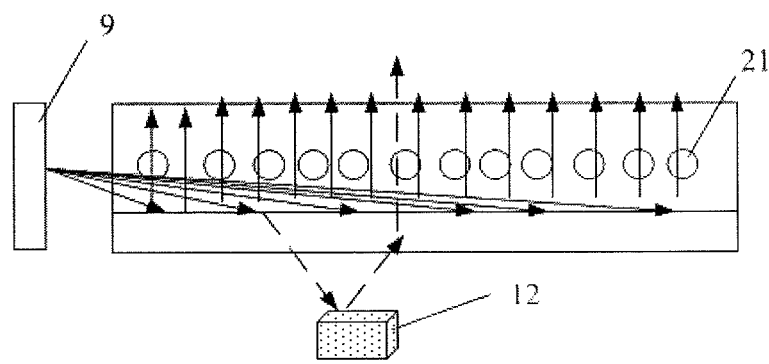
FIG. 5 is a schematic diagram of light path of emergent light from the side light source in Embodiment 1 of the present invention.

In the present embodiment, as shown in FIG. 1, a liquid crystal layer 6 is provided between the color filter substrate 7 and the array substrate 2, and a side light source 9, which comprises a light source 91 and a light guide plate 92 arranged at a side of the light source 91 close to the array substrate 2, is provided at a side (such as left side and/or right side) of the array substrate 2. The light source 91 may be a LED, and the light guide plate 92 is used for guiding propagation direction of light emitted from the light source 91, so that the light emitted from the light source 91 enters into the array substrate 2 after guided by the light guide plate 92. In order to achieve high light utilization and transparent display, the second substrate in the array substrate 2 is formed from a special organic glass substrate, and for example, is made of polymethyl methacrylate. As shown in FIG. 5, the second substrate may be doped with photoinduced reflection particles 21 therein, so that the light emitted from the side light source 9 toward the second substrate can be reflected to both the outer side of the array substrate 2 (i.e., the side of the array substrate 2 away from the color filter substrate 7) and the inner side of the array substrate 2 (i.e., the side of the array substrate 2 close to the color filter substrate 7).

Here, the photoinduced reflection particles 21 are nanoscale metal oxide, nanoscale non-metal oxide, nanoscale metal salt or nanoscale rare-earth metal. Photoinduced reflection particles 21 can change the propagation direction of light and reflect the light from the side light source 9, so that the light from the side light source 9 can be perpendicularly emitted toward the color filter substrate 7 from the array substrate 2, and the light path is shown by solid lines with an arrow in FIG. 5. In addition, since the array substrate 2 itself is transparent, the light from the side light source can also pass through the array substrate 2 and be refracted to a background object 12 at the backside of the array substrate 2, then is perpendicularly emitted toward the color filter substrate 7 from the array substrate 2 after reflected by the background object 12, and the light path is shown by dotted lines with an arrow in FIG. 5. In the display device of the present embodiment, since it is not necessary to provide a direct backlight and a back plate for supporting the direct backlight, the present embodiment can easily achieve transparent display.

Meanwhile, in order to achieve better transparent display and enable layers in the array substrate and the color filter substrate to have better transmittance, a relatively simple implementation is to make thicknesses of the layers in the array substrate and the color filter substrate thinner than those of the corresponding layers in the prior art. For example, thicknesses of a gate insulation layer, a passivation layer and the like in the array substrate may be made thinner; liquid crystal molecules with high transmittance are selected to form the liquid crystal layer, so as to further improve the transmittance of the display device.

Correspondingly, a manufacturing process of the double-sided touch display device in the present embodiment includes the following steps of: preparing the array substrate, preparing the color filter substrate, aligning the array substrate and the color filter substrate to form a cell, providing a driving circuit, and mounting a backlight.

Before elaborating on the specific manufacturing method, it should be understood that, in the present invention, a patterning process may include a photolithography process only, or include a photolithography process and an etching step, and meanwhile, may also include other process used to form a predetermined pattern, such as printing, ink jetting or the like; the photolithography process refers to a process which uses photoresist, mask, exposure machine and the like to form a predetermined pattern and includes processes such as film-formation, exposure, development and the like. A corresponding patterning process may be selected according to each layer structure formed in the present invention.

In the present embodiment, the first touch receiving electrode, the second touch receiving electrode and the touch feedback electrode may be made of the same transparent material, and specifically, the transparent material may be at least one of Indium gallium zinc oxide, indium zinc oxide (IZO for short), indium tin oxide (ITO for short), and indium gallium tin oxide. In the following description of the manufacturing process, detailed description will be given by taking ITO as an example.

At step S1, the array substrate is prepared. Step S1 specifically includes steps S11 to S15.

At step S11, ITO is sputtered on one surface of the washed second substrate (such as glass substrate), a pattern including the second touch receiving electrode 8 is formed by using a patterning process, and the second touch receiving electrode 8 has a thickness between 400 Å and 700 Å.

At step S12, the second substrate is turned upside down, patterns including the gate, the gate insulation layer, a semiconductor layer, the source, the drain, an organic resin layer and a first protection layer (PVX1) are sequentially formed on the other surface of the second substrate by using patterning processes. After the foregoing steps are performed, the thin film transistor 3 and the corresponding first protection layer are formed, and specific process parameters for the thin film transistor 3 may be selected according to production conditions.

At step S13, ITO is sputtered above the first protection layer, a pattern including the touch feedback electrode 4 is formed by using a patterning process, and the touch feedback electrode 4 has a thickness between 400 Å and 700 Å.

At step S14, a second protection layer (PVX2) is deposited on the touch feedback electrode 4, and a via for connecting the pixel electrode 5 and the drain is formed.

At step S15, ITO is sputtered above the second protection layer, and a pattern including the pixel electrode 5 is formed by using a patterning process, thus finishing preparation of the array substrate.

Although the above steps for preparing the array substrate exemplify a process in which the second touch receiving electrode is formed on the outer side of the array substrate (i.e., the side of the array substrate away from the color filter substrate), it should be understood that the above sequence of forming the pattern including the second touch receiving electrode 8 on one surface of the second substrate and forming other patterns on the other surface of the second substrate may be reversed, namely, the sequence of preparing the array substrate may be: step S12, step S13, step S14, step S15, and step S11; it can also be understood that, the second touch receiving electrode may alternatively be formed at the inner side of the array substrate, namely, at the same side of the second substrate as the thin film transistor 3, and preferably, the second touch receiving electrode 8 and the common electrode are formed in one patterning process, that is, the common electrode is formed at step S13 as well.

At step S2, the color filter substrate is prepared. Step S2 specifically includes steps S21 and S22.

At step S21, ITO is sputtered on one surface of the washed first substrate (such as glass substrate), a pattern including the first touch receiving electrode 1 is formed by using a patterning process, and the first touch receiving electrode 1 has a thickness between 400 Å and 700 Å.

At step S22, the first substrate is turned upside down, and patterns of the black matrix 71 and the RGB color filter layer 72 are sequentially formed on the other side of the first substrate by using patterning processes.

Of course, step S2 may further includes step S23 of performing subsequent annealing treatment on the first substrate subjected to step S22, so as to finish preparation of the color filter substrate.

It can also be understood that, the sequence of step S21 and step S22 may also be reversed, which is not described in detail herein.

At step S3, the array substrate and the color filter substrate are aligned to form a cell. Specifically, the array substrate and the color filter substrate are cell-aligned with liquid crystals injected therebetween through a cell-aligning process, thus forming a display panel.

At step S4, a driving circuit is provided and a backlight is mounted.

The double-sided touch display device of the present embodiment is formed after steps S1 to S4 are performed.

To achieve transparent display, the side light source 9 is provided on at least one side of the array substrate 2 in the present embodiment (preferably, the side light sources 9 are symmetrically provided at left and right sides of the array substrate 2, respectively), and rotation directions of liquid crystal molecules in the liquid crystal layer 6 are changed by controlling the voltage of the pixel electrode 5, thus realizing display of images with different grayscales and achieving transparent display. In the top view of the array substrate, relative positions of the side light sources 9 and the array substrate 2 is shown in FIG. 4.

In the double-sided touch display device of the present embodiment, a picture displayed on the display panel can be seen when a voltage is applied to the pixel electrode, while a picture of the background object at the backside of the display panel (i.e., the side of the display panel away from the viewer) can be seen through the display panel when no voltage is applied to the pixel electrode. FIG. 5 is a diagram illustrating the light path of emergent light from the side light source 9, as shown in FIG. 5, in the working process of the double-sided touch display device, when a voltage is applied to the pixel electrode, part of the light emitted from the side light source toward the array substrate (the part shown by solid line with an arrow) is reflected by the second substrate, passes through the liquid crystal layer and exits the display panel from the color filter substrate. Consequently, the picture displayed on the display panel can be seen by human eyes, and the displayed picture is a picture of a visual display of video data source input to the double-sided touch display device. When no voltage is applied to the pixel electrode, the display panel may be considered as a transparent body, in a time period such as daytime or the like when the light is bright, the side light source 9 may not be lightened, natural light irradiates on the background object 12, is reflected by the background object 12 and refracted by the array substrate, then enters human eyes after passing through the liquid crystal layer and the color filter substrate, thereby, the picture of the background object at the backside of the display panel can be seen by the human eyes, and the picture is a visual display of the background object 12 at one side of the double-sided touch display device away from the viewer. Or, in a time period, such as nighttime, when light is weak, the side light source 9 is lightened, part of the light (the part shown by dotted lines with an arrow) is emitted onto the second substrate and refracted outside of the display panel; when the background object 12 is provided at the backside of the display panel, this part of light will be cast onto the background object 12, reflected by the background object 12, refracted by the array substrate and then enters the human eyes after passing through the liquid crystal layer and the color filter substrate, thereby, the picture of the background object at the backside of the display panel can be seen by the human eyes, and the picture is a visual display of the background object 12 at one side of the double-sided touch display device away from the viewer.

It should be noted that, the display device in the present invention is applicable to an ADS (Advanced Super Dimension Switch) mode liquid crystal display device. In such liquid crystal display device, a multi-dimensional electric field is formed by electric fields generated at the edges of slit electrodes arranged in the same plane and electric fields generated between the slit electrodes and a plate electrode, and enables liquid crystal molecules of all orientations between and right above the slit electrodes in the liquid crystal cell to rotate, thereby improving work efficiency of the liquid crystals and greatly increasing light transmission efficiency. ADS technique can improve picture quality of LCD products, and has advantages such as high resolution, high transmittance, low power consumption, wide viewing angle, high aperture ratio, low chromatic aberration, no push mura and the like.

In the present embodiment, the pixel electrode may be plate-shaped, and the common electrode may be slit-shaped, as shown in FIG. 1; optionally, as a modification, the pixel electrode may be slit-shaped, and the common electrode may be plate-shaped; optionally, the pixel electrode and the common electrode both may be slit-shaped or plate-shaped.

Embodiment 2

The present embodiment provides a double-sided touch display device. Compared to Embodiment 1, the double-sided touch display device according to the present embodiment needs no backlight, and light thereof comes from a WOLED (White Organic Light-Emitting Diode).

The double-sided touch display device of the present embodiment comprises an array substrate, in which a light-emitting device that can emit light is provided. The light-emitting device is a WOLED device. The WOLED device comprises a pixel electrode which may be an anode or a cathode of the WOLED device and may be formed from a transparent conductive film. Above the anode or the cathode of the WOLED device, a pixel define layer (PDL for short) is further provided, a light-emitting layer (EL for short) is coated or evaporated, and finally, a cathode or an anode of the WOLED device is formed through sputtering.

Since the WOLED device itself can emit light and has property of transparency, compared to Embodiment 1, in the present embodiment, the side light source is further omitted, which enables the double-sided touch display device to have a simpler structure, while double-sided touch and transparent display are achieved.

Figure 6:
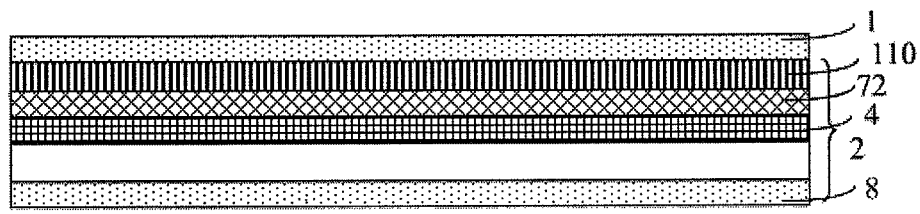
FIG. 6 is sectional view of a double-sided touch display device according to Embodiment 2 of the present invention.

In the present embodiment, the touch electrodes in the display device may be configured to have an in-cell type touch structure, so as to achieve both double-sided touch and transparent display. As shown in FIG. 6, the color filter layer 72 may be directly formed in the array substrate 2, and arranged at a light-emitting side of the WOLED device 110, and the anode or cathode of the WOLED device 72 serves as the pixel electrode which is electrically connected to the drain of the thin film transistor. The array substrate 2 also comprises a touch feedback electrode 4 which may be arranged above or below the color filter layer 72. In the present embodiment, preferably, patterns of the touch feedback electrode 4 and the pixel electrode (the anode or cathode of the WOLED device) are formed from the same layer of film in the same patterning process (in this case, the color filter layer 72 is arranged at a side, opposite to the side provided with the touch feedback electrode 4, of the WOLED). The first touch receiving electrode 1 and the second touch receiving electrode 8 are respectively provided at upper and lower sides of the array substrate 2.

In the present embodiment, the WOLED device 110 may be formed to be of dual emission type (i.e., light can be emitted from both top side and bottom side of the WOLED device), thus achieving double-sided touch and transparent display. Undoubtedly, the WOLED device 110 may also be formed to be of top-emission type or bottom-emission type, which is not limited here.

Other structures of the array substrate and the principle of achieving double-sided touch and transparent display in the present embodiment are the same as those in Embodiment 1, and are not described in detail herein.

Embodiment 3

The present embodiment provides a double-sided touch display device, in which, compared to Embodiment 1, a backlight is not needed, and light comes from an OLED (Organic Light-Emitting Diode).

The double-sided touch display device of the present embodiment comprises an array substrate in which a light-emitting device that can emit light is provided. The light-emitting device is an OLED device. Since the OLED device itself can emit light of various colors and has property of transparency, the side light source is omitted in the present embodiment as compared to Embodiment 1, also, the color filter layer is also omitted in the present embodiment as compared to Embodiment 2, and therefore, the double-sided touch display device has a simpler structure while double-sided touch and transparent display are achieved.

Similarly, in the present embodiment, the touch electrodes in the display device may be configured to have an in-cell type touch structure, so as to achieve both double-sided touch and transparent display. For example, the OLED device is formed in the array substrate, and comprises a pixel electrode, which is an anode or a cathode of the OLED device and is electrically connected to the drain of the thin film transistor; the touch feedback electrode is arranged above or below the OLED device; the first touch receiving electrode and the second touch receiving electrode are respectively provided at upper and lower sides of the array substrate. In the present embodiment, preferably, patterns of the touch feedback electrode and the pixel electrode (i.e., the anode or cathode of the OLED device) are formed from the same layer of film in the same patterning process.

In the present embodiment, the OLED device may be formed to be of dual emission type (i.e., light can be emitted from both top side and bottom side of the OLED device), thus achieving double-sided touch and transparent display. Undoubtedly, the OLED device may also be formed to be of top-emission type or bottom-emission type, which is not limited here.

Other structures of the array substrate and the principle of achieving double-sided touch and transparent display in the present embodiment are the same as those in Embodiment 1, and are not described in detail herein.

In the double-sided touch display device of any one of Embodiments 1 to 3, two touch receiving electrodes are respectively provided at both sides of the touch feedback electrode, and the touch receiving electrodes and the touch feedback electrode are connected to corresponding driving circuits, thus achieving double-sided touch; meanwhile, a light source is provided, and brightness of the light source (e.g., LED, WOLED device or OLED device in a side light source) is controlled by an external circuit, so as to control grayscale of a displayed picture, thus achieving double-sided touch and transparent effect. The double-sided touch display device achieves functions of both double-sided touch and transparent display, has a simple structure, can be manufactured on the basis of the manufacturing process of an array substrate in the prior art, and thus has a simple manufacturing process and low production cost; since materials of the respective layer of the display panel all have good transmittance, under the same condition of display brightness, higher transmittance and lower power consumption can be obtained with small power provided.

The double-sided touch display device of the present invention is not limited to the liquid crystal display device, the WOLED display device and the OLED display device described in Embodiments 1 to 3, and may be any other product with display function.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. A double-sided touch display device, comprising a touch feedback electrode, a first touch receiving electrode and a second touch receiving electrode, wherein the first touch receiving electrode and the second touch receiving electrode are provided at both sides of the touch feedback electrode, respectively,
wherein the double-sided touch display device comprises a color filter substrate and an array substrate which are arranged oppositely, the first touch receiving electrode is arranged on the color filter substrate, the second touch receiving electrode is arranged on the array substrate, both the first touch receiving electrode and the second touch receiving electrode are arranged crosswise relative to the touch feedback electrode to generate mutual capacitances, a liquid crystal layer is provided between the color filter substrate and the array substrate, and a side light source is provided at a side of the array substrate in a direction vertical to a stacking direction of the color filter substrate and the array substrate.

2. The double-sided touch display device according to claim 1, wherein the touch feedback electrode is arranged at a side of the array substrate close to the color filter substrate; the first touch receiving electrode is arranged at a side of the color filter substrate away from the array substrate or at a side of the color filter substrate close to the array substrate, the second touch receiving electrode is arranged at a side of the array substrate away from the color filter substrate or at the side of the array substrate close to the color filter substrate, and the second touch receiving electrode is insulated from the touch feedback electrode at cross areas.

3. The double-sided touch display device according to claim 1, wherein the array substrate comprises a second substrate and a thin film transistor, a pixel electrode and a common electrode which are arranged on the second substrate, the thin film transistor comprises a gate, a source and a drain, the pixel electrode and the drain are electrically connected, and the touch feedback electrode and the common electrode are formed from the same layer of film in one patterning process.

4. The double-sided touch display device according to claim 3, wherein the side light source comprises a light source and a light guide plate arranged at a side of the light source close to the array substrate, and light emitted from the light source enters into the array substrate after being guided by the light guide plate.

5. The double-sided touch display device according to claim 4, wherein the second substrate is made of polymethyl methacrylate, and is doped with photoinduced reflection particles therein to allow the light emitted from the side light source toward the second substrate to be reflected and refracted.

6. The double-sided touch display device according to claim 5, wherein the photoinduced reflection particles are nanoscale metal oxide, nanoscale non-metal oxide, nanoscale metal salt or nanoscale rare-earth metal.

7. The double-sided touch display device according to claim 1, wherein the first touch receiving electrode comprises a plurality of first touch receiving electrode rows arranged in parallel, each of which comprises a plurality of first touch receiving sub-electrodes which are electrically connected in sequence, the second touch receiving electrode comprises a plurality of second touch receiving electrode rows arranged in parallel, each of which comprises a plurality of second touch receiving sub-electrodes which are electrically connected in sequence, the touch feedback electrode comprises a plurality of touch feedback electrode columns arranged in parallel, each of which comprises a plurality of touch feedback sub-electrodes which are electrically connected in sequence, and arrangement directions of the first touch receiving electrode rows and the second touch receiving electrode rows are the same, and are perpendicular to that of the touch feedback electrode columns, respectively.

8. The double-sided touch display device according to claim 7, wherein the touch feedback sub-electrodes included in each touch feedback electrode column have the same number as and are in one-to-one correspondence in position with the first touch receiving electrode rows and/or the second touch receiving electrode rows; the first touch receiving sub-electrodes included in each first touch receiving electrode row and/or the second touch receiving sub-electrodes included in each second touch receiving electrode row have the same number as and are in one-to-one correspondence in position with the touch feedback electrode columns.

9. The double-sided touch display device according to claim 7, wherein the first touch receiving sub-electrode, the second touch receiving sub-electrode and the touch feedback sub-electrode each have a shape of rhombus.

10. The double-sided touch display device according to claim 7, further comprising a touch controller and a central controller, the first touch receiving electrode, the second touch receiving electrode and the touch feedback electrode are all electrically connected to the touch controller, and the touch controller is configured to receive instructions from the central controller and transfer the instructions to the touch feedback electrode, so as to instruct the touch feedback electrode to perform scanning column by column, meanwhile, to input an initial signal to one end of each of the first touch receiving electrode rows and/or one end of each of the second touch receiving electrode rows, to read a terminal signal from the other end of each of the first touch receiving electrode rows and/or the other end of each of the second touch receiving electrode rows, and to determine coordinates of a touch point based on a difference in the terminal signals read from the respective first touch receiving electrode rows and/or the respective second touch receiving electrode rows, and to transmit the coordinates to the central controller.

11. A double-sided touch display device, comprising a touch feedback electrode, a first touch receiving electrode and a second touch receiving electrode, wherein the first touch receiving electrode and the second touch receiving electrode are provided at both sides of the touch feedback electrode, respectively, wherein the double-sided touch display device comprises an array substrate, in which a light-emitting device is provided, the first touch receiving electrode and the second touch receiving electrode are arranged on the array substrate, and both the first touch receiving electrode and the second touch receiving electrode are arranged crosswise with respect to the touch feedback electrode to generate mutual capacitances, the light-emitting device is a WOLED device or an OLED device, and the WOLED device/OLED device comprises a pixel electrode which is an anode or a cathode of the WOLED device/OLED device, and the touch feedback electrode and the pixel electrode are formed from the same layer of film in one patterning process.

12. The double-sided touch display device according to claim 11, wherein the touch feedback electrode is arranged above or below the light-emitting device; the first touch receiving electrode and the second touch receiving electrode are respectively provided at upper and lower sides of the array substrate, and the first touch receiving electrode and the second touch receiving electrode are respectively insulated from the touch feedback electrode at cross areas.

13. The double-sided touch display device according to claim 11, wherein the light-emitting device is the WOLED device, and a color filter layer is further provided on the array substrate and arranged at a light-emitting side of the WOLED device.

14. The double-sided touch display device according to claim 11, wherein the first touch receiving electrode comprises a plurality of first touch receiving electrode rows arranged in parallel, each of which comprises a plurality of first touch receiving sub-electrodes which are electrically connected in sequence, the second touch receiving electrode comprises a plurality of second touch receiving electrode rows arranged in parallel, each of which comprises a plurality of second touch receiving sub-electrodes which are electrically connected in sequence, the touch feedback electrode comprises a plurality of touch feedback electrode columns arranged in parallel, each of which comprises a plurality of touch feedback sub-electrodes which are electrically connected in sequence, and arrangement directions of the first touch receiving electrode rows and the second touch receiving electrode rows are the same, and are perpendicular to that of the touch feedback electrode columns, respectively.

15. The double-sided touch display device according to claim 14, wherein the touch feedback sub-electrodes included in each touch feedback electrode column have the same number as and are in one-to-one correspondence in position with the first touch receiving electrode rows and/or the second touch receiving electrode rows; the first touch receiving sub-electrodes included in each first touch receiving electrode row and/or the second touch receiving sub-electrodes included in each second touch receiving electrode row have the same number as and are in one-to-one correspondence in position with the touch feedback electrode columns.

16. The double-sided touch display device according to claim 14, wherein the first touch receiving sub-electrode, the second touch receiving sub-electrode and the touch feedback sub-electrode each have a shape of rhombus.

17. The double-sided touch display device according to claim 14, further comprising a touch controller and a central controller, the first touch receiving electrode, the second touch receiving electrode and the touch feedback electrode are all electrically connected to the touch controller, and the touch controller is configured to receive instructions from the central controller and transfer the instructions to the touch feedback electrode, so as to instruct the touch feedback electrode to perform scanning column by column, meanwhile, to input an initial signal to one end of each of the first touch receiving electrode rows and/or one end of each of the second touch receiving electrode rows, to read a terminal signal from the other end of each of the first touch receiving electrode rows and/or the other end of each of the second touch receiving electrode rows, and to determine coordinates of a touch point based on a difference in the terminal signals read from the respective first touch receiving electrode rows and/or the respective second touch receiving electrode rows, and to transmit the coordinates to the central controller.

* * * * *